UNITED STATES PATENT OFFICE.

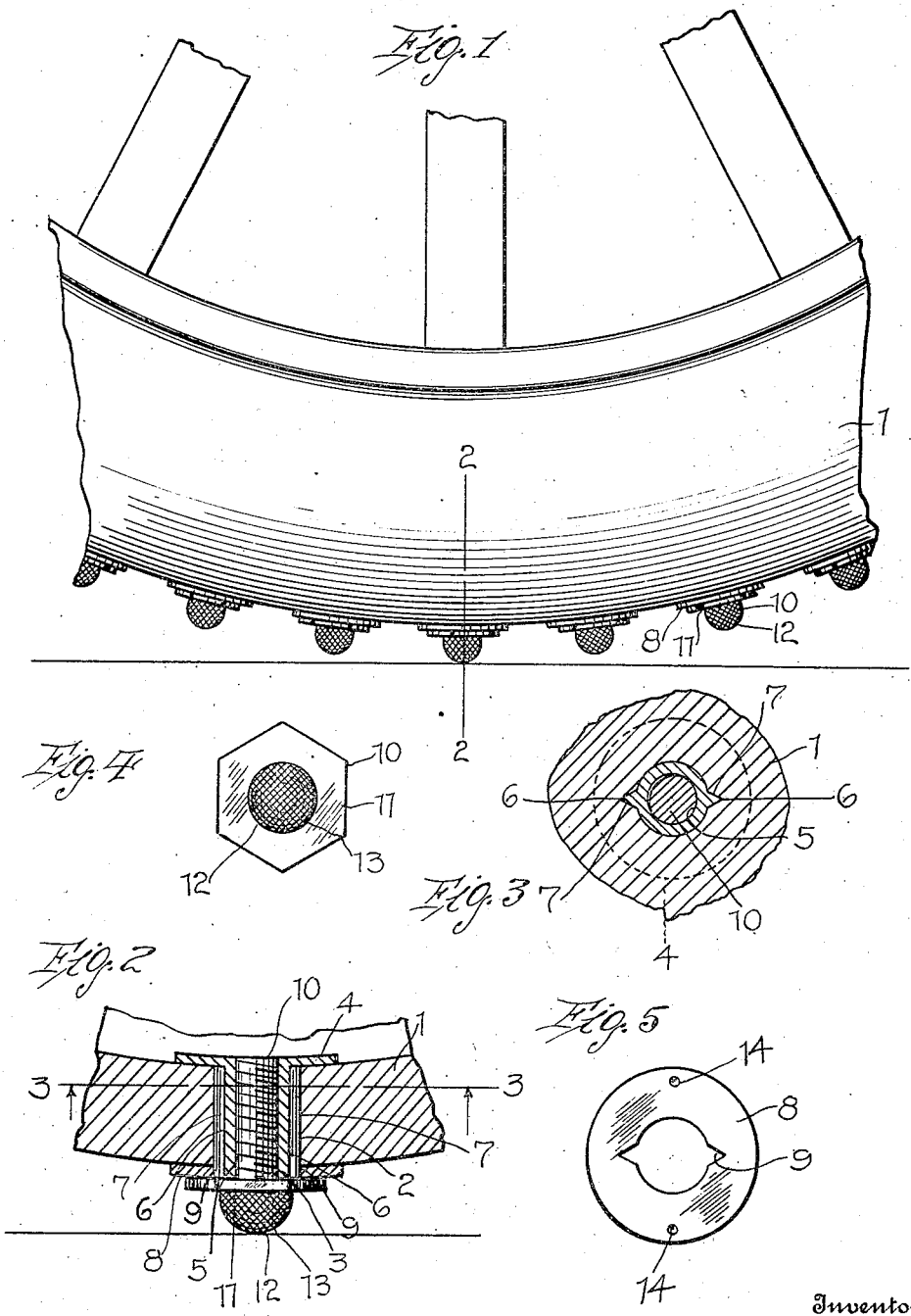

ALLEN G. WAGNER, OF AKRON, OHIO.

ARMORED TIRE.

1,067,563.  Specification of Letters Patent.  Patented July 15, 1913.

Application filed January 22, 1913. Serial No. 743,601.

*To all whom it may concern:*

Be it known that I, ALLEN G. WAGNER, a citizen of the United States, residing at Akron, in the county of Summit and State of Ohio, have invented certain new and useful Improvements in Armored Tires, of which the following is a specification, reference being had to the accompanying drawings.

This invention relates to improvements in tires, and more particularly to that class of tires, the casings of which are armored externally to prevent the tire from skidding or side slipping on wet or icy roadways.

An object of this invention is the provision of a tire, the casing of which is provided with a plurality of cleats which are adapted to grip the surface of the roadway, the cleats being readily removable so that they may be replaced when worn out.

A further object of this invention is the provision of a tire, the casing of which is provided with a plurality of openings, which are adapted to receive tubular threaded plugs, and threaded studs adapted for engagement with the plugs, the studs being formed with enlarged wearing heads for engagement with the surface of the roadway, and the studs being readily removable from the tire when worn out so that new ones may be substituted therefor, whereby the life of the tire is greatly increased.

With these and other objects in view, my invention consists in certain novel constructions, combinations, and arrangements of the parts to be hereinafter more fully described, claimed and illustrated in the accompanying drawing, in which, Figure 1 is a fragmentary side elevation of a tire showing a plurality of my improved cleats applied thereto; Fig. 2 is a section on the line 2—2 of Fig. 1 showing the head of the plug in full lines. Fig. 3 is a section on the line 3—3 of Fig. 2. Fig. 4 is an end view of one of the studs, and Fig. 5 is an elevation of the washer.

Referring more particularly to the drawing, the numeral 1 designates the tire casing formed with a plurality of transverse openings 2, the openings being preferably formed in staggered relation. Disposed within the openings 2 are a plurality of tubular plugs 3, each of the plugs being formed with a base flange 4 which is adapted to rest against the inner face of the tire casing. Each of the plugs 3 is interiorly threaded as at 5, and formed on the outer face of each plug are a pair of longitudinally extending beveled ribs 6, the ribs being preferably diametrically opposite each other. The walls of the openings 2 in the casing are formed with diametrically opposite V-shaped grooves 7, for the reception of the ribs 6 of the plugs, to prevent the plugs from turning relatively to the tire.

Disposed on the outer ends of the plugs 3 and bearing against the outer periphery of the casing, are washers 8, the washers being also formed with diametrically opposite V-shaped notches 9 for the reception of the ribs 6 of the plugs. Suitable ground engaging cleats are secured in the plugs, the cleats being preferably formed of threaded studs 10 for engagement with the interior threads 5 of the plugs, the studs being formed near their outer ends with laterally extending flanges 11 which are adapted to bear against the outer face of the washers 8. The outer ends of the studs are formed with enlarged heads 12 which are preferably roughened or corrugated as at 13 whereby the studs will firmly grip the surface of the ground or roadway and prevent skidding of the tire.

It will be understood that if desired, the heads 12 of the studs may be formed of hard rubber, but it is preferable that they be constructed of steel or other hard metal.

In the practical use of my device, the plugs are inserted in the openings 2 in the casing, so that the base flanges 4 bear against the inner periphery of the casing, and the washers 8 are disposed on the outer ends of the plugs, to provide suitable bearing surfaces for the flanges 11 of the studs. When the studs 10 are threaded into the plugs so that the flanges 11 frictionally engage the washers 8, it will be apparent that the device will be ready for use, and the several parts will be held in relative engagement with each other until it is desired to remove them. If desired, the outer faces of the washers 8 may be formed with recesses 14 for the reception of suitable tools whereby the washers may be held firmly while the cleats are being secured to the plugs.

While the construction illustrated in the accompanying drawing is the preferred embodiment of my invention, it will be understood that minor changes in construction may be made without departing from the spirit of the invention or sacrificing any of its advantages as determined by the scope of the appended claim.

What I claim is:—

In combination with a tire casing having an opening therein, an interiorly threaded plug disposed in said opening, a flange formed on the inner end of said plug for engagement with the inner face of said casing, the outer face of said plug being formed with a pair of longitudinal diametrically opposite ribs, a washer disposed on the outer end of said plug and being formed with a pair of diametrically opposite notches for the reception of said ribs, and a stud threadably connected in said plug, said stud being formed near its outer end with a flange for engagement with said washer, as and for the purpose described.

In testimony whereof I hereunto affix my signature in the presence of two witnesses.

ALLEN G. WAGNER.

Witnesses:
 EARL P. WILHELM,
 ANDREW J. WILHELM.